3,574,814
PROCESS FOR MANUFACTURING
POLYCARBONATE FILAMENTARY
Béla von Falkai, Wolfgang Rellensmann, Manfred Reichardt, and Alfred Reichle, Dormagen, Germany, assignors to Farbenfabriken Bayer Aktiengesellschaft, Leverkusen, Germany
No Drawing. Continuation of application Ser. No. 526,688, Feb. 11, 1966. This application Oct. 6, 1969, Ser. No. 864,960
Claims priority, application Germany, Apr. 22, 1965, F 45,877
Int. Cl. D01d 5/12
U.S. Cl. 264—210                    3 Claims

ABSTRACT OF THE DISCLOSURE

Filamentary and foil material from high molecular weight linear polycarbonate having a molecular weight from 95,000–150,000 and a crystalline content of at least 18% produced by shaping a solution of the polycarbonate in an organic solvent into linear form and stretching the linear form shaped material at a draw ratio of at least 4:1 by discrete point stretching at a temperature above the crystallization temperature limit and below the crystallite melting point thereof.

---

This is a continuation of Ser. No. 526,688 filed Feb. 11, 1966.

This invention relates to filamentary, film and foil material or article made from high molecular weight linear polycarbonates and to the production of such filamentary, film and foil material or article having improved properties.

As is well known, high molecular weight linear polycarbonates based on bisphenols can be shaped by various processes from the melt or from solution to form filaments, films, foils and similar structures.

The molecular weights of the linear high molecular weight polycarbonates employed for these processes are generally chosen to lie between 50,000 and a maximum of 95,000.

Apart from some very valuable properties such as good fastness to light, excellent electrical insulating properties and low inflammability, the structures obtained from these polycarbonates have inadequate resistance to solvents and temperatures for practical purposes due to an insufficiently high crystalline content. This has particularly adverse effects in filaments and fibres, which manifests itself in the very great irregularity in the titre and the fact that the maximum temperatures which can be used for fixing and ironing are too low.

Well crystallised foils or filaments and fibres having satisfactory physical and textile technological properties as required for practical purposes can be produced by various known processes, e.g. by mixing certain non-solvent or low solvent agents with definite physical properties into the solutions of high molecular weight linear polycarbonates before the forming process and stretching the resulting filaments and foils in the hot state by known processes or by treating the amorphous structures formed from pure methylene chloride solutions prior to their forming process with liquids which act as swelling agents on amorphous polycarbonates and stretching the filaments or foils in the swelled state without additional application of heat.

For large scale production however, these processes all have the disadvantage that in addition to the solvent for the polycarbonate, e.g. methylene chloride, a second organic liquid component is required as auxiliary solvent, which, of course, increases the cost of the process and makes it more complicated.

The present invention relates to a simplified process for the production of highly crystalline, high molecular weight polycarbonate filaments, fibres, film and foils having improved textile and technological properties from high molecular weight linear polycarbonates, in which it is not necessary to use an auxiliary solvent in addition to the main solvent.

The process is characterised in that extremely high molecular weight linear polycarbonates, having molecular weights of 95,000 to 150,000, are formed into filaments or fibres and foils from pure solvents such as methylene chloride and the shaped structures are stretched "at discrete points" as will be explained hereinafter, by at least four times, preferably 6 to 10 times, of their original length at a temperature between the crystallisation temperature limit and the crystallite melting point of the polycarbonates.

The crystallisation temperature limit of the high molecular weight linear polycarbonates is understood to be that temperature below which an amorphous polycarbonate cannot be detected, by dilatometric measurements, to undergo crystallisation even after prolonged periods, e.g. of 1000 hours.

The crystallisation temperature limit for linear high molecular weight polycarbonates based on 2,2-(4,4'-dihydroxydiphenyl)-propane was found, by interpretation of the change of specific volume with time at various crystallisation temperatures, to be 170° C.±2.5° C.

Evaluation of dilatomeric experiments carried out below this characteristic temperature could no longer be related to the course of the crystallisation process of the high molecular weight polymer but only as a glass type response.

The temperature of the melting maximum of the crystallite can be determined by differential thermo analysis of the shaped, unstretched structure by a method described by H. Morita and H. M. Rice (Anal. Chem. 27, p. 336–39 (1955)).

"Discrete point" hot stretching is understood to mean stretching, preferably on heated rollers, of a defined, localised zone of less than 5 cm., preferably less than 1 cm., at a temperature kept constant to within of ±2.5° C., preferably ±1.0° C.

Especially suitable for the process of the invention are extremely high molecular weight film-forming and fibre forming polycarbonates of 2, 2-(4,4'-dihydroxydiphenyl)-propane. It is also possible to use the known fiber- and film-forming polycarbonates of 2,2-(4,4'-dihydroxy-3,3'-dichlorodiphenyl)-propane, of 2,2-(4,4'-dihydroxydiphenyl)-butane or copolycarbonates of 2,2-(4,4'-dihydroxydiphenyl)-propane and 0.5 to 20 mols percent of a different dihydroxydiarylalkane and/or a different aromatic, aliphatic or cycloaliphatic dihydroxy compound, such as 4,4'-dihydroxydiphenylmethane, 1,1-(4,4'-dihydroxydiphenyl)-cyclohexane, 1,1-(4,4'-dihydroxydiphenyl)-ethane, 4,4'-dihydroxydiphenylsulphone, 4,4'-dihydroxydiphenylether, 4,4'-dihydroxydiphenyl, 2,6-dihydroxynaphthalene, hydroquinone, resorcinol, hexane-1,6-diol, cyclohexane-1,4-diol, p-xylylene glycol and 2,2-(4,4'-dihydroxyethoxy-diphenyl)-propane and lastly, copolycarbonates of 4,4-dihydroxydiphenylmethane and/or other aromatic, aliphatic or cycloaliphatic dihydroxy compounds, such as those mentioned above, in a wider range of mixing. The high molecular weight polycarbonates of molecular weights 95,000 to 150,000 are produced by known processes (see Angewandte Chemie, 68th year, pages 633–660 (1956)).

Extremely high molecular weight polycarbonates are understood to be those having molecular weights of at least 95,000 and preferably 100,000 to 150,000. The reason why these are preferred for the process according to the invention is that in spite of their high molecular weight they are found, surprisingly, to undergo crystallisation at temperatures above recrystallisation temperature limits more readily than the polycarbonates which have medium molecular weights of 35,000 to 75,000. This increased readiness to crystallisation manifests itself inter alia in a higher crystalline proportion, e.g. at least 18% crystalline content, as can be detected by measurements of the specific volume at crystallisation temperatures above the crystallisation temperature limit. Thus, for example, for polycarbonates based on 2,2-(4,4'-dihydroxydiphenyl)-propane of different molecular weights, widely different crystalline contents were found at a crystallisation temperature of 195° C., as indicated in the following table:

TABLE 1

| Molecular weight: | Crystalline content |
|---|---|
| 32,000 | 24.5 |
| 51,000 | 14.5 |
| 73,000 | 6.5 |
| 95,000 | 25.0 |

If structures formed from polycarbonates which have relatively low molecular weights but can nevertheless, according to Table 1 be crystallised by tempering are stretched, the stretched articles have only inadequate mechanical properties, e.g. the break resistances are too low and the E moduli are too small.

For carrying out the process, the extremely high molecular weight polycarbonates are dissolved in a solvent such as methylene chloride or chlorobenzene at room temperature or elevated temperature to form a 10 to 25%, preferably 14 to 18% solution and are then spun into filaments on the usual principles of solution spinning, preferably by the dry spinning process, or cast into foils on drums by known casting processes.

The shaped structures freed from solvents are then stretched at a stretching ratio of 1:4 to 1:10, preferably 1:6 to 1:8.5, on heated rollers at a roller temperature of 175 to 250° C., preferably 185 to 200° C.

The conventional commercial stretch twisting machines with heatable rollers may, for example, be used for the stretching of filaments.

The filaments, fibres and foils produced according to the invention have good textile technological and mechanical properties, e.g. high break resistances and E moduli and good resistance to solvents, so that they can be utilised for many purposes.

The following examples serve to illustrate but in no way to limit the invention.

EXAMPLE 1

Polycarbonate having a molecular weight of 96,000 corresponding to a relative solution viscosity of $\eta_{rel}=1.93$ [1] and prepared from 4,4'-dihydroxydiphenyl-2,2-propane by the phosgenation process is dissolved in methylene chloride to form a 16.5% solution, filtered and spun at a solution temperature of 75° C. into a shaft heated to 220° C. through a multiaperture spinneret of aperture diameter 100µ while air preheated to 90° C. is blown into the spinneret chamber. The filaments leaving the end of the shaft are drawn off over rollers at a rate of 180 m./min. and wound. The filaments stretched above the crystallisation temperature limit on hot rollers at a roller tempera-

[1] Measured in 0.5% solution in methylene chloride at 20° C.

ture of 182° C. in the ratio of 1:7.2 by "discrete point stretching" having the following properties:

Titre—50/15 den.
Stretch—4.1 g./den.
Elongation at break—22%
E modulus (at 1% elongation)—420 ± 20 kg.wt./mm.$^2$
Irregularity of titre [1]—±3.2%
Crystalline content [2]—18.5%
Crystallite melt maximum (by differential thermoanalysis)—265° C.
Shrinkage in perchloroethylene (at room temperature, 10 mins.) or more—0.3%
Heat shrinkage (measured at 180° C., 30 mins.)—14.2%

[1] Measured with Zellwager-Uster instrument.
[2] The crystalline content was determined by Hermans method (Makromol. Chemie 64, pages 135–139 (1963)).

EXAMPLE 2

Polycarbonate based on 2,2-(4,4'-dihydroxydiphenyl)-propane of molecular weight 116,000, corresponding to a relative solution viscosity of $\eta_{rel}=2.34$ [2] is dissolved in methylene chloride to form a 15.8% solution, filtered and, in a manner analogous to Example 1, spun through a 120 aperture spinneret of aperture diameter 100µ to form an endless band of total titre 2150 den.

A groups of such spun bands is then stretched on a stretching roller at a roller temperature of 185° C. in the ratio of 1:7.5 by "discrete point" stretching as defined above, while being run off and are then crimped by compression and cut.

The individual fibres have the following constants:

Titre—2.5 den.
Strength—3.8 g./den.
Elongation at break—24%
E modulus (at 1% elongation)—380±25 kg. wt./mm.$^2$
Crystalline content [1]—23.5%
Crystallite melt maximum (measured by differential thermoanalysis)—271° C.
Shrinkage in perchloroethylene (at room temperature 10 min. and more)—0.3%
Heat shrinkage (measured at 180° C. 30 min)—1.9%

[1] The crystalline content was determined by Hermans method (Makromol. Chemie 64, pages 135–139 (1963)).

A yarn produced from these fibres has the following yarn constants.

Nm—40/1
Tensile strength—17.8 Rkm.
Elongation at break—24%
Uster non-uniformity [1]—±7%

[1] Measured with Zellwager-Uster instrument.

This yarn is woven into a lightweight fabric for outer garments and is distinguished by very good recovery from creasing and fastness to ironing.

EXAMPLE 3

A polycarbonate solution prepared according to Example 1 is cast on a drum to form a film and dried in an air current at a temperature of 145° C. After stretching on a roller at a roller temperature of 195° C., with the stretching zone remaining very accurately localised to a narrow strip of about 1 cm., the film produced in this way has a strength of 35 kg./mm.$^2$ and a crystalline content of 22%. This foil remains dimensionally stable up to a temperature of 155° C. even after being subjected to this temperature for a long time and at room temperature it is free from shrinkage in many organic solvents such as acetone, perchloroethylene alcohols and hydrocarbons.

EXAMPLE 4 (FOR COMPARISON)

(A) The endless bands produced according to Example 2 are not stretched on rollers with very accurate localisation of a "discrete point" stretching zone but are stretched on a hotplate with a larger not accurately localised stretch-

[2] Measured in 0.5% solution in methylene chloride at 20° C.

ing zone, at a surface temperature of 188° C., in a ratio of 1:5.4 (optimum stretching ratio). These filaments are considerably inferior in their textile technological properties:

Tensile strength—3.1 g./den.
Elongation at break—25%
Crystalline content—5%
Shrinkage in perchloroethylene (at room temperature 10 mins. and more)—4.2%
Heat shrinkage (measured at 180° C. 30 min.)—>30%

(B) The procedure is as in Example 1 but a stretching temperature below the crystallisation temperature limit, e.g. 165° C. is chosen; it is only possible to obtain very irregularly stretched filaments with a maximum stretching ratio of 1:3.5. Moreover, these filaments do not have adequate properties for use, as mentioned in Example 4(A).

(C) The procedure is the same as in Example 1 except that instead of extremely high molecular weight polycarbonate, a polycarbonate of medium molecular weight of 75,000, corresponding to a relative solution viscosity of $\eta_{rel}=1.72$ is used. The filaments, which are stretched above the crystallisation temperature limit at 182° C. in accordance with Example 1 by "discrete point" stretching are found to be practically amorphous in X-ray investigations and has inadequate resistance to solvents and temperature.

What is claimed is:
1. Process for the production of filmentary and film articles from linear high molecular weight polycarbonates which comprises shaping a solution of a high molecular weight linear polycarbonate having a molecular weight of 95,000 to 150,000 in an organic solvent into linear form and stretching the linear form shaped article substantially free from any solvent by discrete point stretching in a localized zone of less than 1 cm. at a draw ratio of 6–8.5:1 and at a temperature above the crystallization temperature limit and below the crystallite melting point of said polycarbonate to provide a stretched article having a crystalline content of at least 18%.

2. Process according to claim 1 wherein said article is shaped into a filament.

3. Process according to claim 1 wherein said article is shaped into a film.

References Cited

UNITED STATES PATENTS

| 3,005,236 | 10/1961 | Reichle et al. | 264—290 |
| 3,229,015 | 1/1966 | Kramer | 264—290 |
| 3,329,755 | 7/1967 | Reichardt et al. | 264—210 |
| 3,385,814 | 5/1968 | Falkai et al. | 264—205 |
| 3,454,526 | 7/1969 | Rellensman et al. | 264—184 |

JAY H. WOO, Primary Examiner

U.S. Cl. X.R.

264—205, 288, 290